No. 862,720. PATENTED AUG. 6, 1907.
A. A. DAY.
APPARATUS FOR PREPARING AND FEEDING FINE FUEL.
APPLICATION FILED MAR. 14, 1906.
9 SHEETS—SHEET 2.
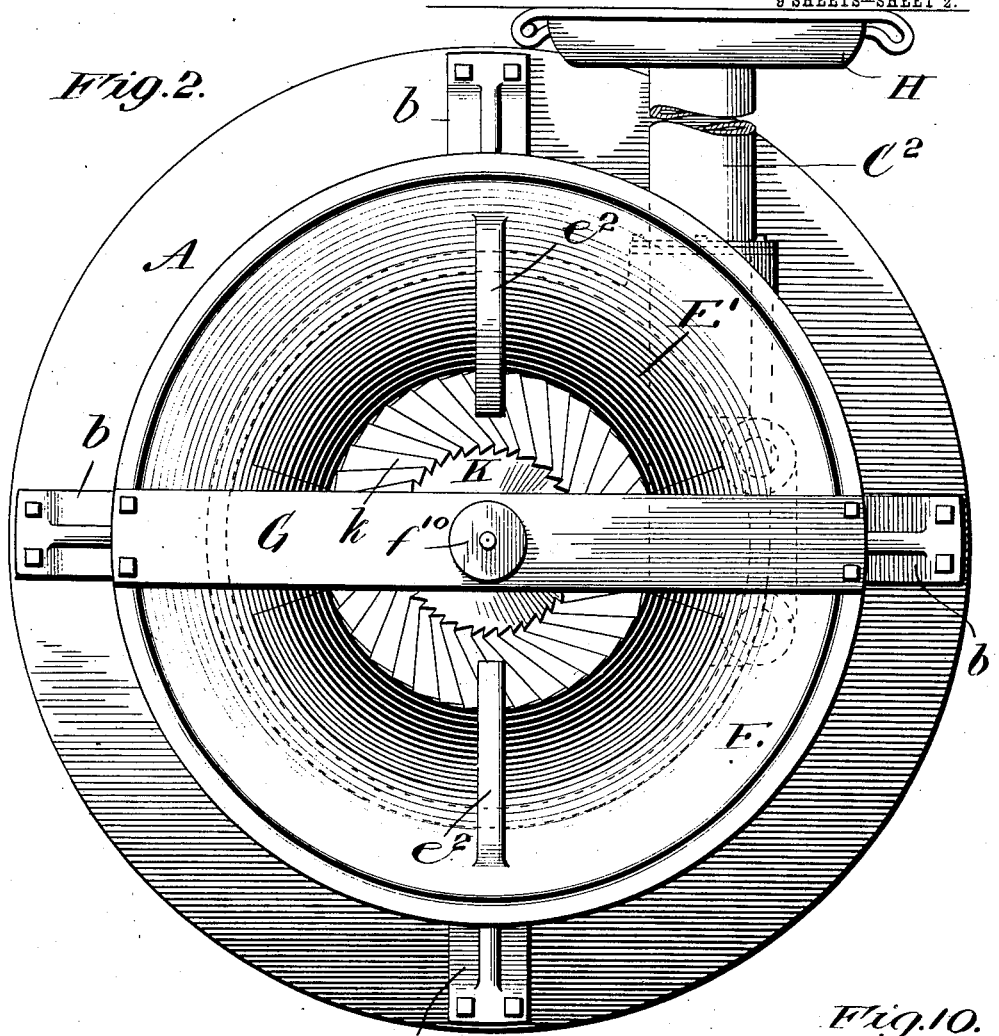
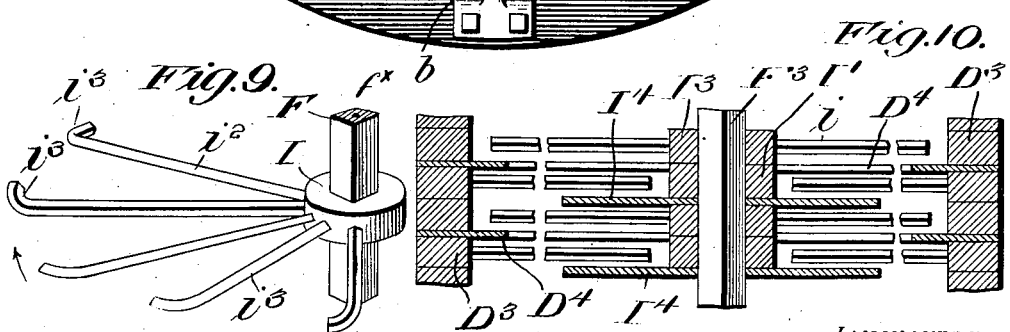
WITNESSES:
INVENTOR
Albert A. Day,
By Whitaker   
Attorney

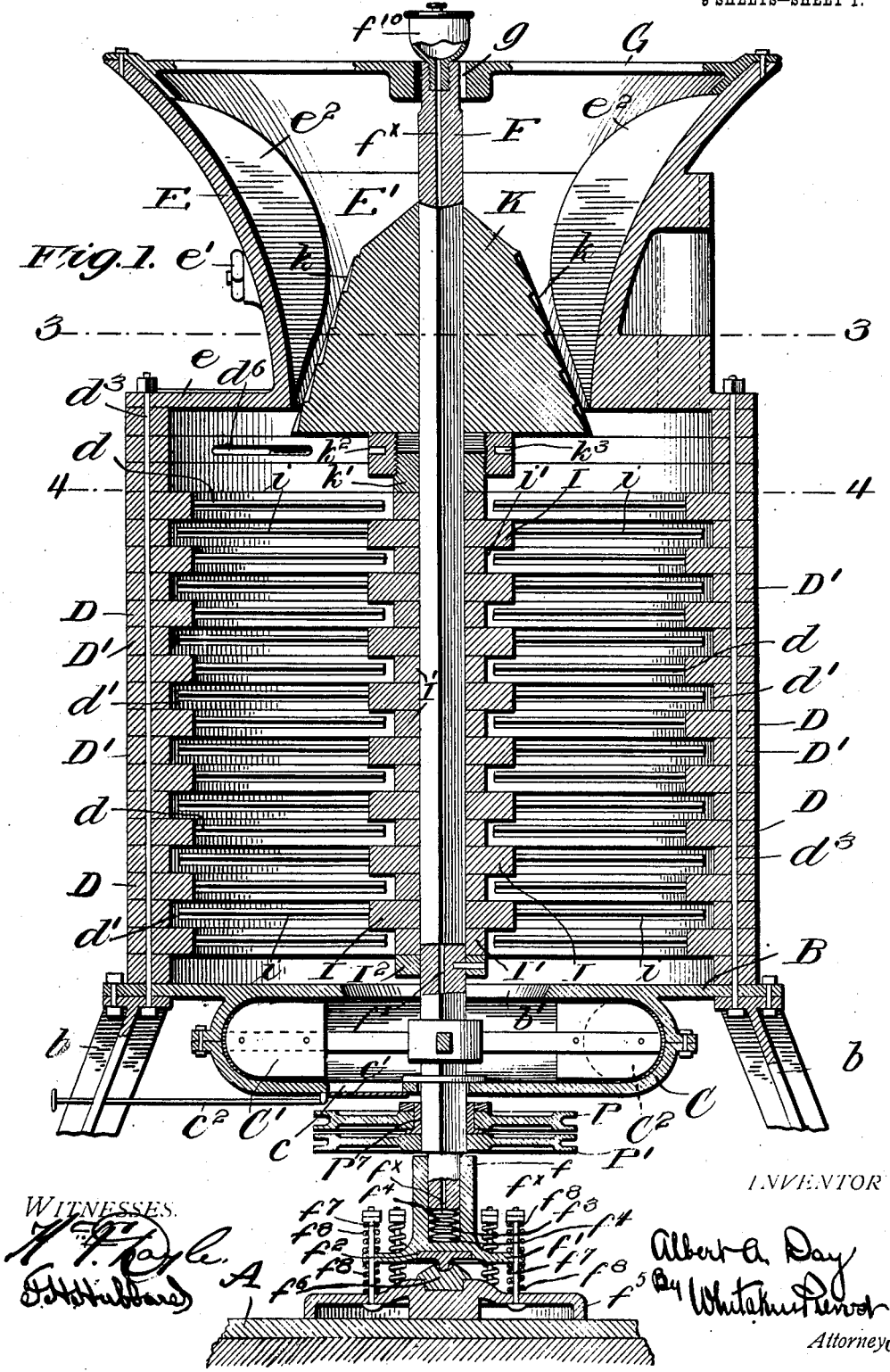

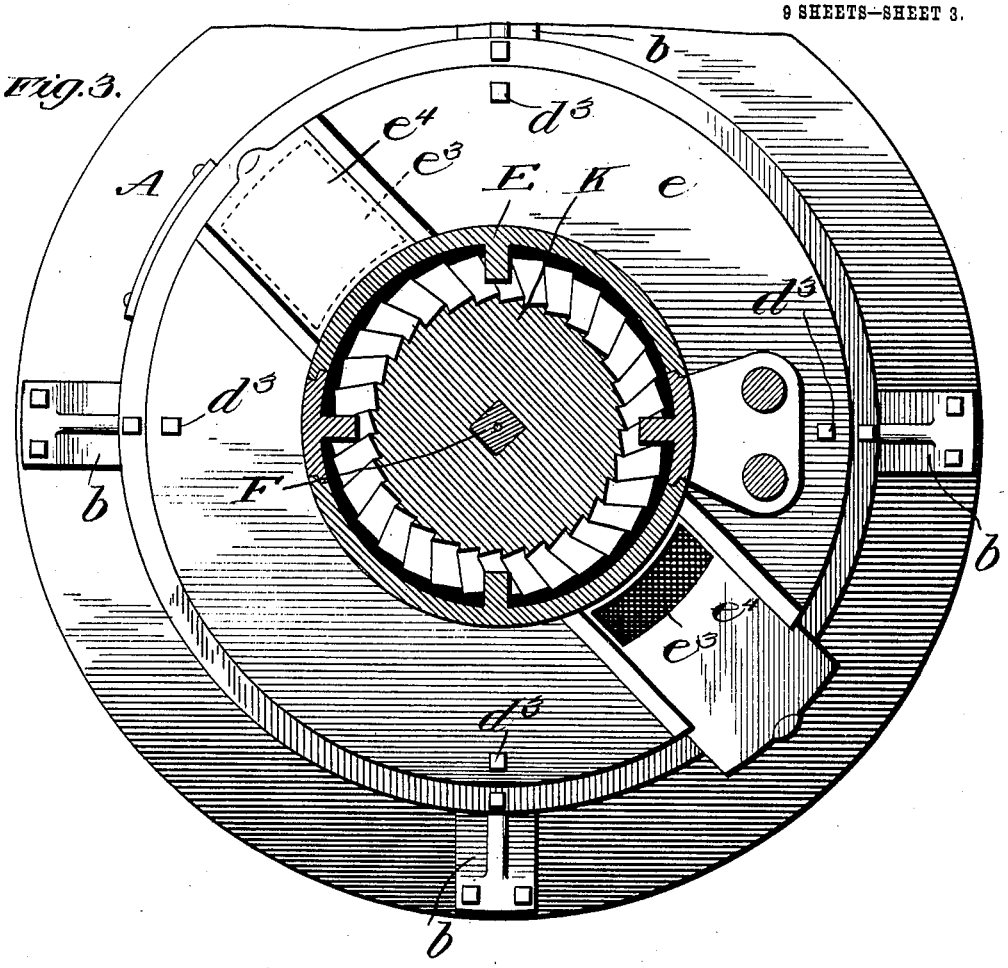

No. 862,720. PATENTED AUG. 6, 1907.
A. A. DAY.
APPARATUS FOR PREPARING AND FEEDING FINE FUEL.
APPLICATION FILED MAR. 14, 1906.
9 SHEETS—SHEET 4.
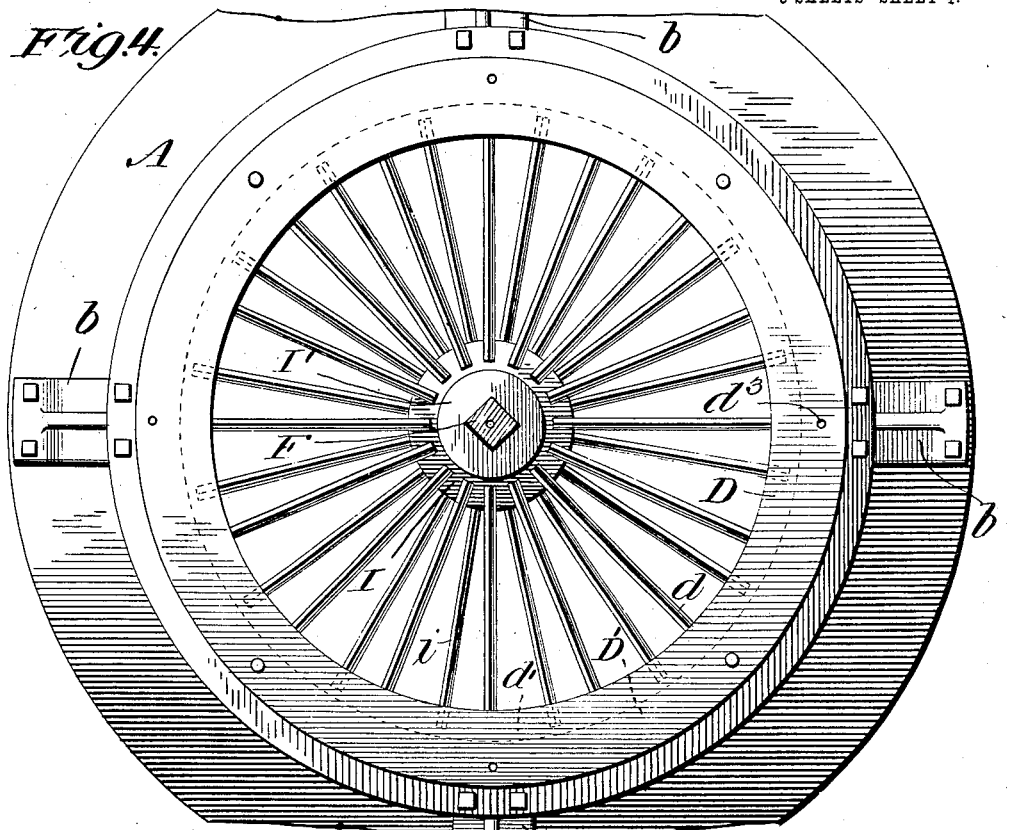
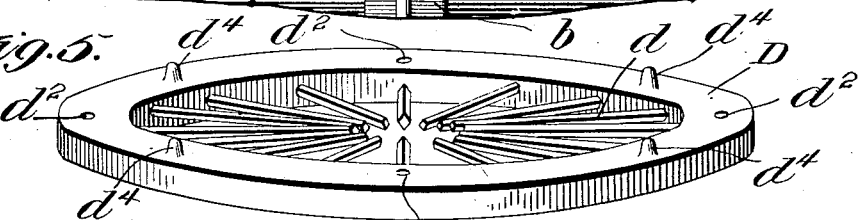
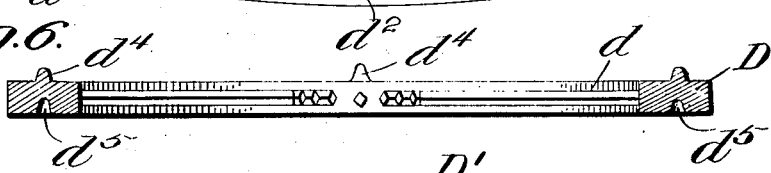
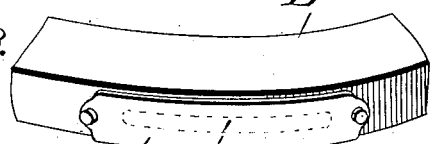
INVENTOR
Albert A. Day
BY Whitaker Prevost
Attorneys
WITNESSES:

No. 862,720. PATENTED AUG. 6, 1907.
A. A. DAY.
APPARATUS FOR PREPARING AND FEEDING FINE FUEL.
APPLICATION FILED MAR. 14, 1906.
9 SHEETS—SHEET 5.
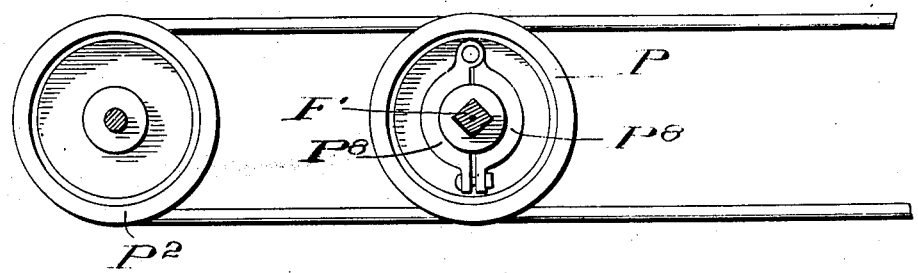
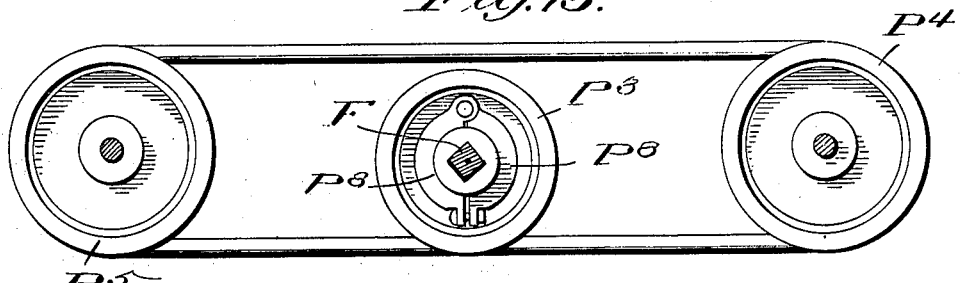
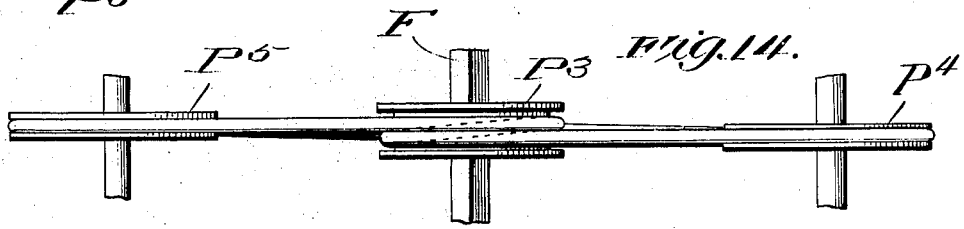
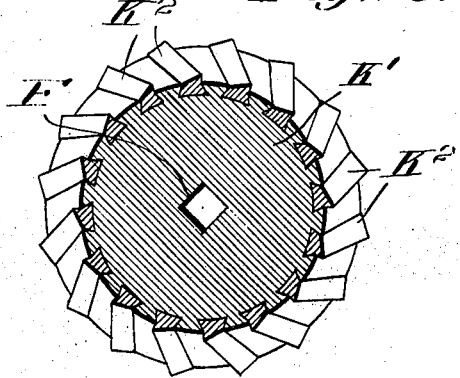
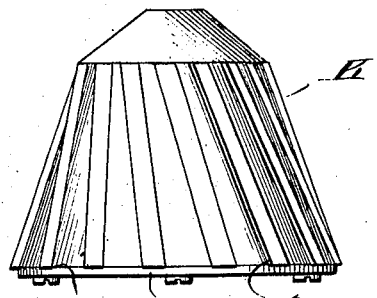
WITNESSES
INVENTOR
Albert A. Day
By
Attorneys No. 862,720. PATENTED AUG. 6, 1907.
A. A. DAY.
APPARATUS FOR PREPARING AND FEEDING FINE FUEL.
APPLICATION FILED MAR. 14, 1906.
9 SHEETS—SHEET 6.
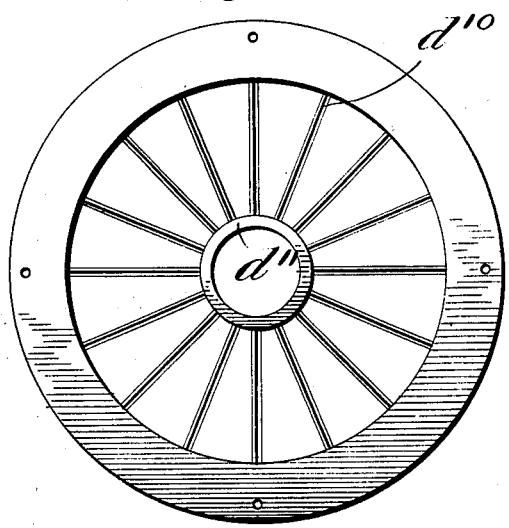
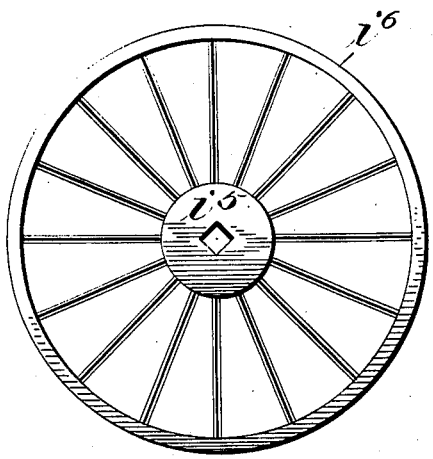
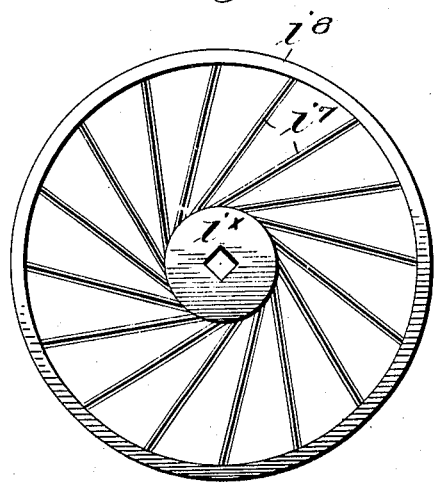
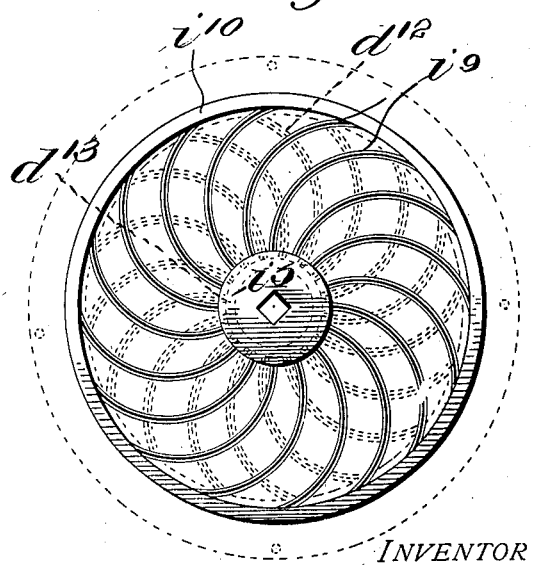
WITNESSES
INVENTOR
Albert A. Day
By Whitaker Prevost
Attorneys No. 862,720. PATENTED AUG. 6, 1907.
A. A. DAY.
APPARATUS FOR PREPARING AND FEEDING FINE FUEL.
APPLICATION FILED MAR. 14, 1906.
9 SHEETS—SHEET 7.
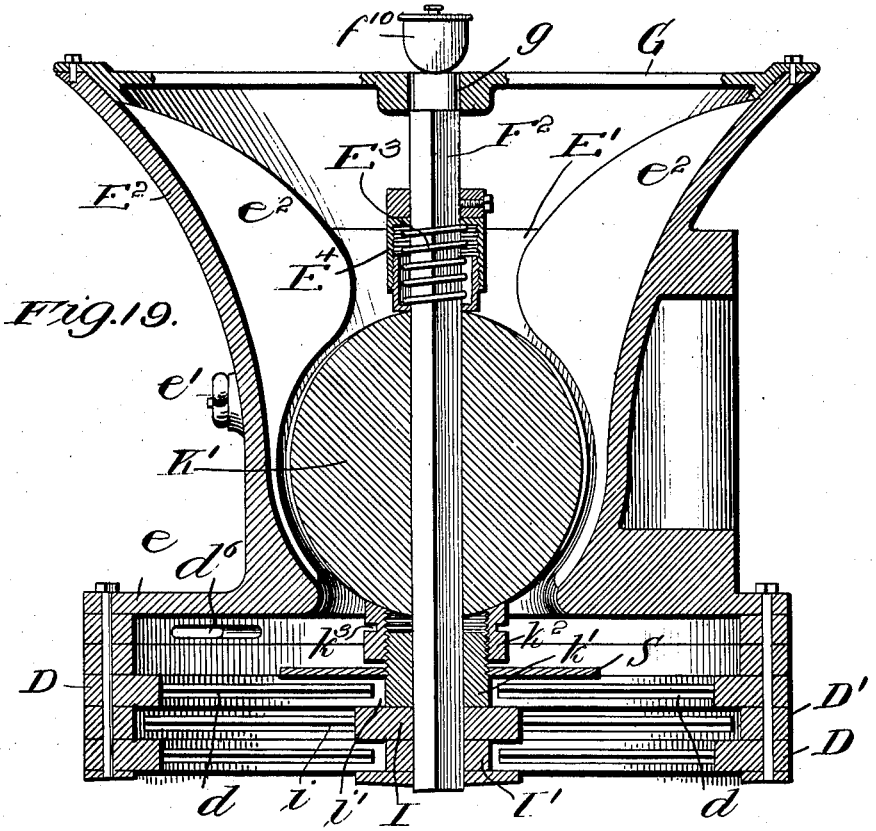
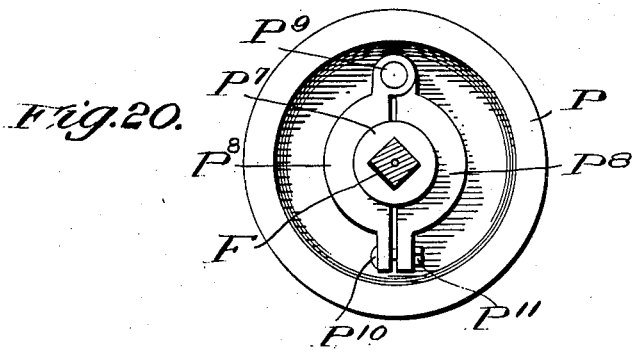
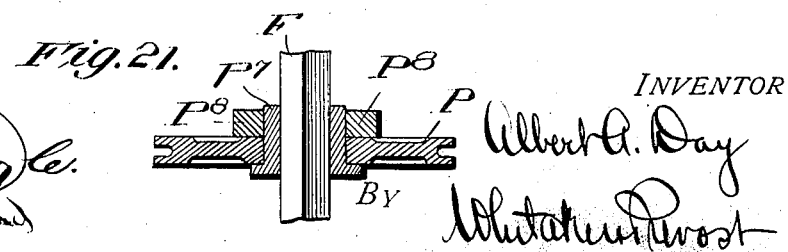
WITNESSES:
INVENTOR
Albert A. Day
BY
Whitaker Prost
Attorneys

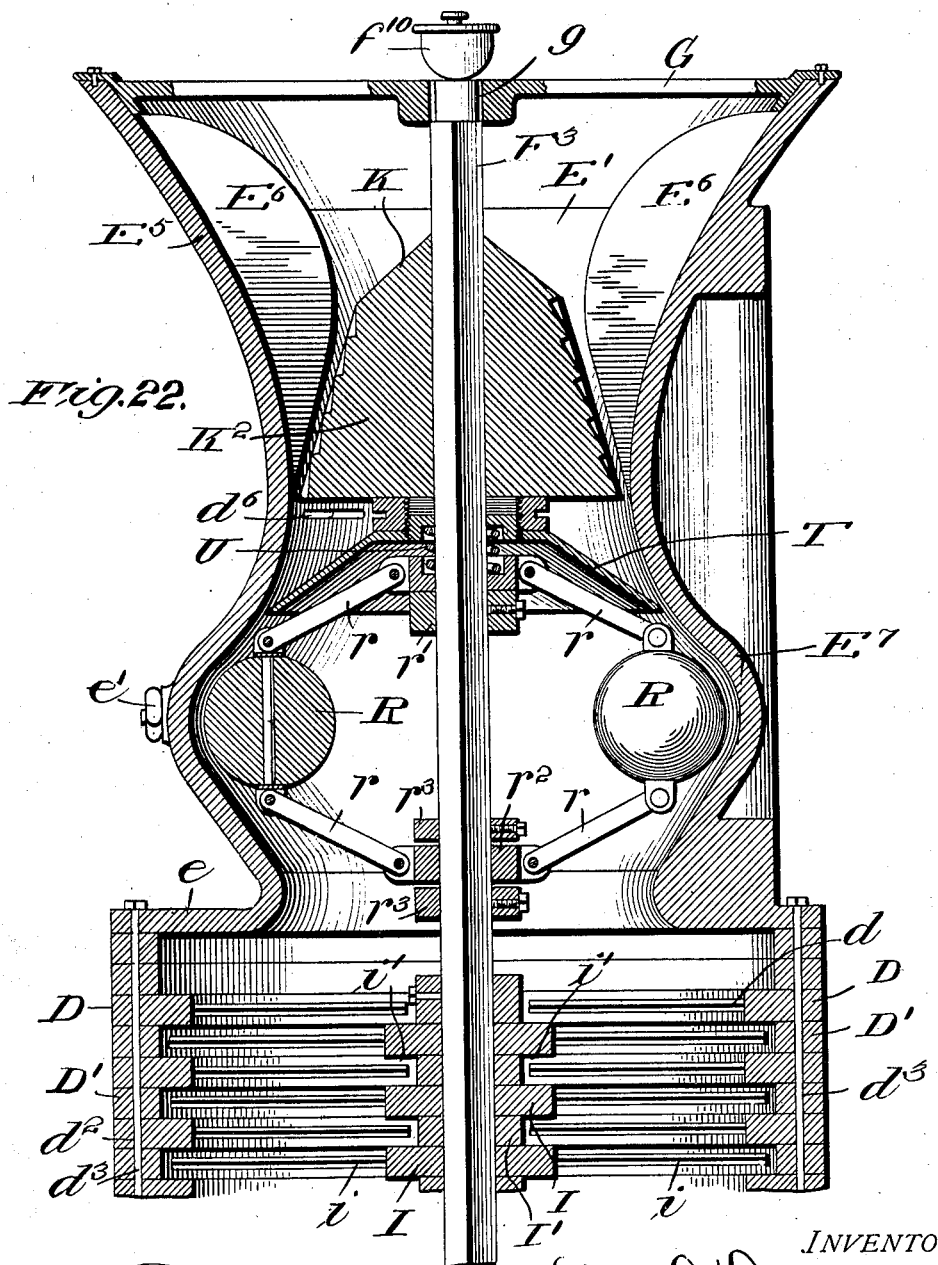

No. 862,720. PATENTED AUG. 6, 1907.
A. A. DAY.
APPARATUS FOR PREPARING AND FEEDING FINE FUEL
APPLICATION FILED MAR. 14, 1906.
9 SHEETS—SHEET 9.

UNITED STATES PATENT OFFICE.

ALBERT A. DAY, OF NEW YORK, N. Y.

APPARATUS FOR PREPARING AND FEEDING FINE FUEL.

No. 862,720.　　　　Specification of Letters Patent.　　　　Patented Aug. 6, 1907.

Application filed March 14, 1906. Serial No. 306,074.

*To all whom it may concern:*

Be it known that I, ALBERT A. DAY, a citizen of the United States, residing at the borough of Brooklyn, in the city of New York, county of Kings, and State of New York, have invented certain new and useful Improvements in Apparatus for Preparing and Feeding Fine Fuel; and I do hereby declare the following to be a full, clear, and exact description of the invention, such as will enable others skilled in the art to which it appertains to make and use the same.

My invention consists in the novel features hereinafter described reference being had to the accompanying drawings which illustrate one form in which I have contemplated embodying the invention and the invention is fully disclosed in the following description and claims.

Figure 25:
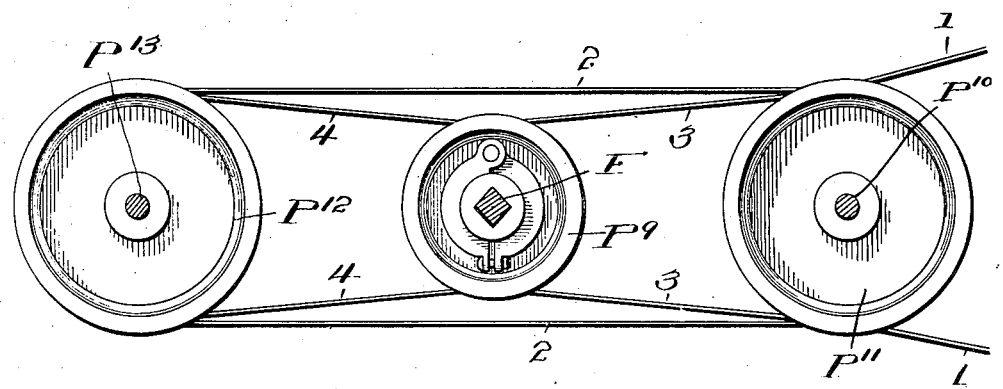
Figure 26:
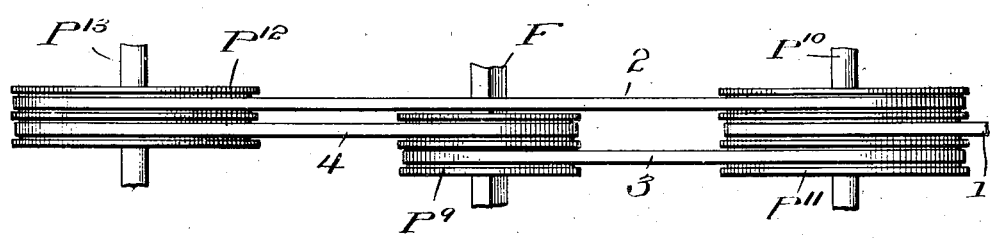

Referring to the said drawings: Figure 1 represents a vertical sectional view of a machine embodying my invention. Fig. 2 is a top plan view of the machine. Fig. 3 represents a horizontal sectional view on line 3—3 of Fig. 1 looking down. Fig. 4 is a similar view on the line 4—4 of Fig. 1 looking down. Fig. 5 is a perspective view of one of the ring sections of the cylindrical pulverizing chamber. Fig. 6 is a vertical central sectional view of the same. Fig. 7 (Sheet 3) is a perspective view of the collar for adjusting the abrading cone vertically. Fig. 8 (Sheet 4) is a partial perspective view of one of the rings showing provision for adjusting said collar from the outside of the machine. Fig. 9 (Sheet 2) is a detail perspective view of one of the shaft rings showing a modified form of impact bar. Fig. 10 (Sheet 2) is a partial vertical sectional view of the pulverizing chamber, showing a modified construction thereof. Fig. 11 (Sheet 3) is a similar view showing another slight modification. Figs. 12, 13 and 14 are detail views illustrating mechanism for driving the machine. Fig. 15 is a plan view of a modified form of one of the ring sections showing the inner ends of the stationary impact bars united by a circular brace ring. Fig. 16 is a similar view of a modification of one of the central hub sections having the rotary impact bars thereof united at their outer ends by a circular brace ring. Fig. 17 is a similar view of a further modification of one of the central hub sections showing the impact bars placed at an angle to the radii of the hub and provided with the outer brace ring. Fig. 18 is a similar view of a further modification showing the impact bars curved throughout their length and indicating in dotted lines the construction of one of the coöperating ring sections provided with stationary impact bars curved throughout their length reversely to the rotary bars. Fig. 19 is a detail sectional view of a modified form of hopper and initial abrading device. Figs. 20 and 21 are a plan and section of the main drive pulley for the central operating shaft illustrating a form of safety clutch applied thereto. Fig. 22 is a view similar to Fig. 19 showing a further modified form of hopper and initial reducing mechanism. Fig. 23 (Sheet 5) is a detail view of a modified form of abrading cone showing the abrading or cutting edges removable. Fig. 24 is a side elevation of the same. Fig. 25 is a plan view of a modified arrangement for driving the vertical shaft. Fig. 26 is an elevation of the same.

The object of my invention is to produce an apparatus for preparing coal lignite, charcoal or other fuel and feeding it in pulverulent form to a boiler furnace, the feed being continuous and capable of regulation and to so construct the apparatus that it will be simple and comparatively inexpensive to build and capable of attaining the desired ends with a greatly reduced expenditures of power. To this end I employ a vertically disposed hopper provided with internal wings to hold the coal from circulating within the hopper, a rotary abrading device within said hopper, a pulverizing chamber below the hopper provided with rotary impact bars coöperating with stationary impact bars, and a withdrawing and ejecting fan below the pulverizing chamber to withdraw the finely reduced fuel and deliver it with a suitable volume of air continuously to the fire box of a furnace, the rotary abrading device, the rotary impact bars and the fan being all supported and operated by a single vertical shaft, driven at a high rate of speed and deriving the advantage of its momentum in carrying out the steps previously referred to. The vertical shaft is supported in such manner that it is permitted a gyroscopic movement, or in other words has a free axis of revolution and in this instance, is supported at the bottom by a pivotal or oscillating bearing, the upper end being provided with a steadying bearing permitting a certain amount of lateral movement or play, so that when rotating at high speed the axis of revolution of the shaft rotating parts is free to adjust itself to the vertical and in this way the rotating parts will come into a state of equilibrium like a top, thus obviating the necessity of accurately balancing them.

In the drawings, Figs. 1 to 8 inclusive, I have illustrated one form of apparatus for carrying my invention into effect. In these drawings A represents a bed plate for supporting the machine. Above this bed plate is supported the bottom plate B of the pulverizing chamber, in this instance by means of suitable standards $b$, secured thereto, and to this bottom plate B is secured the fan casing C. I prefer to cast the upper half of the fan casing integral with the plate B, as shown, and to form the other half separate and bolt it to the upper half, but this is a mere detail of construction. The bottom plate B is provided with a central opening $b'$ which forms a communication between the pulverizing chamber and the fan casing. The bottom plate supports the pulverizing chamber which may be formed in many ways but is preferably built up by a series of ring sections. In these figures I have shown the pulverizing chamber as formed of a plurality of wide rings D, carrying stationary impact bars d, extending radially toward the center, and alternating with a series of spacing rings D' having the same external diameter as rings D but a greater internal diameter, so the annular grooves or recesses d' are provided between the rings D, on the interior of the casing. One of the rings D is shown in perspective in Fig. 5 and in section, Fig. 6 (Sheet 4). Each of the rings D and D' is provided with a number of vertical holes $d^2$ (four being shown) for the passage of vertical tie bolts $d^3$ which pass through all the ring sections and unite them to form a strong and rigid casing. To further solidify the structure of the casing I prefer to provide each ring D and D' with interlocking parts as shown in Figs. 5 and 6, in which the upper face of the section is shown provided with a series of lugs $d^4$ (four being shown) and the lower face provided with a similar series of recesses $d^5$ to receive the lugs of the adjacent ring D'. These interlocking devices assist in preventing lateral movement of the rings upon each other, and makes a very strong construction; they may, however, be omitted if desired.

E represents a vertically disposed hopper which is supported upon the pulverizing casing and is preferably provided with a horizontal plate e extending outwardly from its lower part, which is adapted to fit on top of the ring sections just described and has apertures for the passage of the bolts $d^3$. These bolts $d^3$ preferably extend through apertures in the bottom plate B, and flanges of the supporting standards thereof and are provided with nuts above the hopper plate e, thus uniting all the parts of the frame work of the machine. An additional advantage of this construction is that the various parts can be readily separated for repairs if necessary and in case of serious injury to a part, it can be removed and replaced by a new part without causing serious delay and without necessitating the renewal of other parts. The hopper E is provided with a hinged portion E' in its wall secured by a suitable locking device e' which can be opened to permit any refractory foreign substance to drop out of the hopper. The interior of the hopper is provided with stationary inwardly projecting wings $e^2$ (of which any desired number may be employed), to hold the coal from rotation.

F represents a vertical shaft extending through the hopper, pulverizing chambers and fan casing and supported at the lower end by a pivoted or oscillating step bearing for permitting the shaft to assume a slight angularity to the vertical and to have a gyroscopic movement in rotating. Any form of bearing may be employed which will produce this result, for example, a ball or point upon the lower end of the shaft, revolving in a cup like depression, but I have shown one form of bearing which will give the desired freedom of movement and at the same time reduce the wear of the parts to a minimum.

f represents a bearing sleeve closed at its lower end, provided at its lower end with a laterally extending flange f' and on its bottom, in line with the hollow portion of the sleeve, a removable stud or projection $f^2$, of hardened steel, which is inserted in a recess in the sleeve and may be renewed when worn. Within the sleeve f are a series of loose disks $f^3 f^4$ having convex upper and lower faces, the disks $f^3$ being of hardened steel and the disks $f^4$ of bronze, the uppermost disk receiving the end of the shaft F. Below the sleeve f is a base plate $f^5$ resting upon a suitable foundation and provided centrally with a removable hardened cup $f^6$ in which rests the hardened stud of the sleeve.

$f^7 f^7$ represent a series of bolts which extend loosely through holes in the base plate $f^5$ and the flange f' of the bearing sleeve, and $f^8 f^8$ represent a pair of springs surrounding each bolt above and below said flange for maintaining the sleeve f substantially vertical, while permitting the gyratory movement of the shaft F.

At the upper end of the hopper is a transverse bar G provided with a steadying bearing g of greater diameter than the shaft, so that the shaft has a sufficient amount of play in the upper steadying bearing to permit it to revolve and gyrate to bring the shaft and its connected parts into perfect equilibrium, when rotated at high speed. When in rapid rotation the shaft F will revolve in its step entirely independent of the steadying bearing and will not ordinarily touch said upper bearing, which is merely provided to steady the shaft in starting and to support it if necessary when at rest.

The shaft F is provided with a central longitudinal oil passage $f^\times$ extending throughout its length, communicating at its lower end with the interior of the step bearing sleeve, and at the upper end with an oil cup $f^{10}$ secured to the top of the shaft, to provide for lubricating the step bearing.

The shaft F carries all the moving parts of the machine as will hereinafter fully appear and is preferably formed square in cross section between the bearing portions to facilitate placing and removing the parts and insuring their proper rotation with the shaft.

Upon the shaft F within the fan casing C is the fan C' which ejects the pulverized fuel through a delivery tube $C^2$ passing through the furnace door H (see Fig. 2) or otherwise connected to the furnace so as to deliver the fuel mixed with air into the fire box thereof.

Within the pulverizing chamber the shaft F is provided with a plurality of circular blocks I carrying radial impact bars i said blocks I alternating with circular spacing blocks I' of smaller diameter, the construction being such that the rotary impact bars i pass between the stationary impact bars d and have their outer ends projecting into the annular recesses d' between the ring sections D, while the central portions of the stationary bars d extend into the annular recesses i' between the blocks I. This construction insures that no material can pass around the ends of either the stationary impact bars or rotary impact bars without being acted upon by the next lower series of bars. The blocks I, I' have square central apertures to engage the shaft. The blocks I and I' may be supported vertically upon shaft F in any desired way. I have shown the shaft provided with a fixed collar $I^2$ just above the bottom plate B, which serves to support these blocks.

The upper part of the shaft F is provided with a conical abrading device K having a square central opening to fit upon the shaft, and provided exteriorly with spiral abrading ribs k. The conical portion of the abrading device is of greater diameter at its lower part than the bottom of the hopper, so that by raising and lowering the abrading device upon the shaft F, the annular space between the bottom aperture of the hopper and the periphery of the abrader can be adjusted to increase and decrease the feed of coal to the furnace, without materially altering the fineness of the product since the abrader merely acts to abrade the coal as it is held from rotation by wings $e^2$ and chip off small particles which are pulverized in the pulverizing chamber below.

The vertical adjustment of the abrader with respect to the hopper can be accomplished in many ways. I have shown for this purpose a block $k'$ having a squared opening to fit on the shaft F and externally threaded and an adjusting ring $k^2$ internally threaded and screwed onto the block $k'$, said ring $k^2$ (shown in detail in Fig. 7, sheet 3) having a series of apertures $k^3$ in its periphery to receive a rod by which it may be turned. To enable the abrader to be adjusted from the exterior of the machine I preferably form one of the external rings of the pulverizing casing in line with the ring $k^2$ with a horizontal aperture $d^6$ (see Figs. 1 and 8, sheets 1 and 4 respectively) which is closed exteriorly by a removable plate $d^7$ secured to the section by screws $d^8$. A rod can be inserted through this aperture $d^6$ to turn the ring $k^2$ in either direction and so adjust the abrader K with respect to the hopper to vary the feed of the machine.

In Fig. 23, I have shown a modified form of abrading cone $K'$ in which the abrading or cutting projections are formed separately as indicated at $K^2$ in the form of hardened steel blocks dovetailed in cross section, which are formed separately from the cone proper. The cone $K'$ is formed with a series of dovetailed recesses into which the detachable blocks $K^2$ are slipped, said blocks being supported at the bottom by means of shoulders $K^3$ which may be formed integrally with the said cone or may be provided by means of a ring or plate $K^4$ bolted to the bottom face of the cone as shown and projecting under the bottom ends of the dovetailed grooves. By this construction the abrading surfaces may be replaced or sharpened when desired by removing the blocks $K^3$.

Air may be admitted into the pulverizing chamber at the top through apertures $e^3$ in the hopper plate $e$ which forms the top of said chamber and said apertures are provided with adjustable closing slides $e^4$ for regulating the quantity of air admitted. The fan casing C is also provided with one or more air inlet openings $c$ (see Fig. 1 in which one such opening is shown). The opening $e$ is supplemental to the air inlets $e^3$ before described and is provided with an adjustable regulating slide $c'$ operated by a rod $c^2$ extending to a convenient point where it can be reached by an operator.

The shaft F may be driven in any desired manner. I prefer to drive it in such a manner that in case some refractory material like a piece of iron, etc., finds its way into the machine with the coal, the driving means may be permitted to slip and allow the shaft F and its connected parts to stop until the refractory material is removed, as by opening the hinged portion of the hopper, thus avoiding breaking the machine. To this end, I provide the shaft F adjacent to its lower end with a sleeve $P^7$ (see Figs. 20 and 21) provided with a square opening to fit the shaft, and upon this sleeve I place the pulley P, the sleeve extending above the face of the pulley, and upon the pulley P. I arrange a friction clutch consisting of two members $P^8$ $P^8$ pivoted at $P^9$ to the pulley, and having curved portions frictionally engaging the sleeve $P^7$. The ends of said clutch members farthest from their pivot are connected by an adjusting screw or adjusting bolt $P^{10}$ and nut $P^{11}$ as shown. By tightening this bolt, the requisite frictional engagement of the pulley with the sleeve $P^7$ may be secured so that the shaft F and connected parts may be properly driven by the pulley P from any suitable source of power, and yet permit the pulley to slip if a piece of refractory material should become wedged in the machine and tend to stop it. I do not limit myself to this particular form of clutch as the same desirable result may be accomplished in other ways. I also prefer to provide means for compensating for the lateral draw or pull of the driving belt on the pulley P and shaft F, where the shaft is driven by a belt as herein shown and in Figs. 1, 12, 13 and 14, I have shown two arrangements for this purpose. In the construction illustrated in Figs. 1 and 12 the shaft F is provided with a second pulley $P'$ which may be rigidly secured thereto and an idle pulley $P^2$, supported in any suitable manner on the side of the shaft opposite to that toward which the driving belt tends to draw shaft F, is belted to the pulley $P'$ so that the side pull of the driving belt is offset by the opposite pull of the belt connecting pulleys $P'$ and $P^2$.

In Figs. 13 and 14 a similar construction is shown, in which $P^4$ represents the driving pulley, located on one side of the shaft F and $P^5$ the idle pulley on the opposite side thereof, and of slightly greater diameter than the pulley $P^3$ on the shaft F. In this instance only one pulley ($P^3$) is used on the shaft F and is provided with a wider groove or belt face and a single belt is passed around the outer sides of pulleys $P^4$ and $P^5$ and entirely around pulley $P^3$ as shown. In some instances I may dispense with the friction clutch and depend upon the slipping of the belt to relieve the machine when it encounters a refractory object, but I prefer to employ a friction clutch of some form in all cases.

The operation of the machine is as follows: Coal is fed to the hopper E and is abraded by the rapidly rotating abrader K being held from rotation the while by wings $e^2$, the particles of coal will move downward and escape between the bottom of the hopper and the abrader into the pulverizing chamber, where they will be acted upon by the rotary and stationary impact arms and owing to the high speed and momentum of the rotary devices will be reduced to an impalpable powder with a minimum consumption of power. The powdered coal escapes through aperture $b'$ in the bottom plate B into the fan casing along with the current of air which enters through the upper part of the machine, and the powdered coal and air is discharged into the furnace by fan $C'$. By adjusting the abrading device with respect to the hopper, a regulation of the feed of coal to the furnace is secured and this regulation can be more minutely attained by a manipulation of the slides or dampers $e^4$ and $c'$ previously described. By closing the slide $e^4$ the draft downward through the machine is increased and the progress of the powdered coal through the machine will be retarded. A further retarding of the coal is effected by opening the supplemental air inlet $c$ in the fan casing and the desired regulation for any particular furnace or for particular requirements can be readily obtained by means of the various adjustments herein provided. The retarding of the passage of the coal through the pulverizing chamber also increases the fineness of the product delivered to the furnace and these air inlets can also be manipulated to secure simultaneously the desired fineness of the product and the desired rapidity of the feed to the furnace.

I prefer to make the impact bars square or diamond shape as shown, and to get them so as to present a sharp edge on the forward side but I do not limit myself to such construction as rods of round or other cross sectional form may be used if desired. In Fig. 9 I have shown a slight modification in the form of rotary impact bars, here designated by the reference character $i^2$ and shown as having their ends bent or curved as at $i^3$. I prefer to bend the ends of the rods forward as shown by the arrow in Fig. 9 but it is obvious that they might be turned rearward if found desirable.

In Fig. 11 I have shown a further slight modification of the construction of the pulverizing chamber which consists in setting the stationary and rotary impact rods at an angle to the axis of the casing and shaft, as shown at $i^4$ and $d^9$ respectively, the construction of the casing being otherwise the same as described in reference to Figs. 1 to 8. I prefer to incline the bars $d^9$ upwardly and the bars $i^4$ downwardly as shown but it is obvious that they might be inclined in the opposite directions if preferred.

In Fig. 10 I have illustrated another slight modification of the pulverizing chamber construction. In this construction the ring sections of the casing designated $D^3$ are all alike and between alternate pairs of said sections are flat sheet metal rings or annular plates $D^4$ having their internal diameter less than that of the ring sections. The shaft here designated $F^3$ is provided with circular blocks $I^3$ all of same size and between alternate pairs are sheet metal or flat disks $I^4$ alternating with the rings $D^4$. The alternate rings $D^3$ and blocks $I^3$ are provided with stationary and rotary impact arms respectively and the flat rings $D^4$ and disks $I^4$ serve to determine the travel or path of the material longitudinally downward through the pulverizing chamber. I prefer to make the disks $I^4$ carried by the shaft of considerable diameter so as to keep the course of the material nearer the outer ends of the rotary impact bars where their operative force is greatest.

In Fig. 15 I have shown another modified form of ring section in which the stationary impact bars $d^{10}$ are united at their inner ends by an annular brace or ring $d^{11}$ to give them greater strength and in Fig. 16 I have shown the same idea applied to the correspondingly rotary impact bars $i^5$, the outer ends of which are connected by an annular brace or ring $i^6$. In some cases it may be found that there is a tendency of the rotary impact bars to throw the material centrifugally so as to interfere somewhat with the proper operation of the impact bars thereon and I may, therefore, provide impact bars of peculiar construction to overcome this centrifugal tendency of the material. In Fig. 17 for example, I have shown a hub or block $I^X$ having rotary impact bars $i^7$ secured thereto at a forward angle to the radii of said block so as to exercise a retarding effect upon the material laterally to keep it from being thrown against the walls of the casing, the outer ends of said bars being also united by the ring or brace $i^8$. The stationary impact bars may, if desired, be oppositely inclined.

In Fig. 18 I have shown a hub or blocks $I^5$ provided with the rotary impact bars $i^9$ which are curved throughout their length so as to have a retarding effect laterally upon the material and in dotted lines I have shown the corresponding set of stationary bars which are preferably curved throughout their length in the opposite direction. The outer ends of the bars $i^9$ are connected by the brace or ring $i^{10}$ and the inner ends of the stationary bars $d^{12}$ are connected by a brace or ring $d^{13}$.

In Fig. 19 I have shown a slight modification of the devices for initial reduction which consists in providing the hopper $E'$ with an abrading device $K'$ in the form of a sphere (instead of a cone) and having its outer surface roughened to abrade particles of the coal held by the hopper wings $E^2$ in the manner previously described. The abrader $K'$ is supported upon an adjustable device similar to that shown in Fig. 1, which is secured to the shaft $F^2$. I also provide above the spherical abrader $K'$ a spring $E^3$ for holding it down upon its support but permitting it to rise slightly to avoid breakage in case a piece of refractory material is encountered, said spring being incased to protect it from contact with the coal, as shown at $E^4$. Below the abrading device $K'$, I also provide the shaft with a horizontal disk S or plate, which extends laterally beyond the annular space through which material is delivered from the abrading mechanism, so that any refractory material which passes through the abrading mechanism will fall upon this disk from which it may be removed through the orifice giving access to the devices for adjusting the abrader vertically.

In Fig. 22 I have shown another modification of the initial reduction mechanism. In this figure the hopper $E^5$ is elongated and in the upper part is provided with wings $E^6$ and a conical abrader $K^2$ of the type shown in Fig. 1. The lower part of the hopper is provided with a horizontal curved portion $E^7$ forming an annular horizontal trough and in this portion of the hopper the shaft $F^3$ is provided with two or more centrifugally acting spherical balls or weights R, R connected by links $r\ r$ with a fixed supporting ring $r'$ above and a vertically movable ring $r^2$ below, both of which are carried by the shaft. The vertical movement of the lower ring is limited in both directions by the fixed collars $r^3\ r^3$ on the shaft, the upper of which is so placed as to prevent the balls from coming into contact with the annular trough $E^7$ of the hopper and may be adjusted to vary the distance from said hopper that the balls shall remain when in their outermost positions. The object of this centrifugal device is to give the material an intermediate crushing between them and the trough $E^7$ before it passes to the pulverizing chamber. It is obvious that any one of the forms of hopper and preliminary reducing mechanism shown in Figs. 1, 19 and 22 can be used with a pulverizing chamber comprising any of the types of ring and block sections and impact bars herein shown and described. I also provide the shaft with a shield T which is conveniently made of conical form and interposed between the initial abrading mechanism and the centrifugal reducing mechanism to deliver the material adjacent to the walls of the hopper where it can be operated upon by the centrifugal balls. I also prefer to insert a spring U between the initial abrader or cone K² and the upper support for the balls R, R, this allowing the cone to yield downwardly and said support to yield upwardly to allow refractory material to pass between the cone and the hopper wall, or between the said balls and the hopper walls without injury to the apparatus.

In the operation of devices for preparing and feeding fine fuel, the vibration of the shaft or shafts of the pulverizing devices, where driven at high speed, has been one of the greatest difficulties to be contended with as the vibration soon causes machines of this class to wear their bearings thus increasing the vibration and causing the machine to pound. By mounting all the rotating parts upon a vertical shaft, one end of which is given a slight play, preferably in the steadying or upper bearing, it is found that when driven at high speed the rotating body comes into a state of perfect equilibrium under the action of the law of mechanics governing bodies rotating upon a free axis and all vibration of the shaft ceases so that when running at normal speed it spins like a top and does not ordinarily touch the upper or steadying bearing. This is a very important feature in this class of machines run with low horse power, as it enables me to make a small and cheap machine in which it is not necessary to nicely balance the parts and yet which can be run at the high speed necessary to produce the desired pulverizing action, without any jar or vibration or undue wear of bearing.

Another important advantage of the vertical arrangement is that the feed of the material through the machine is facilitated both by the force of gravity, and also by the natural draft downward of the air from the upper end of the hopper, to the eye of the fan at the bottom of the pulverizing chamber. This gives two forces coacting to produce a feed of the material and the latter force, to wit, the draft of the air, can be accurately regulated by means of air admission ports or openings, with adjustable closures, at the upper end of the pulverizing chamber for the purpose of admitting more or less additional air, and a similar admission port and closure on the lower side of the fan casing to serve as a check draft if desired. These regulated air admission devices also enable the quantity of air admitted to the fan to be regulated with respect to the quantity of fuel fed, so that the supply necessary for complete combustion may always be furnished and the amount of air in proportion to the fuel may be increased or diminished without interfering with the rapidity of feed of the material through the machine. For example, suppose it is desired to increase the quantity of air in proportion to the fuel without affecting the draft through the machine. In such case the air ports at the top of the pulverizing chamber are opened more and the auxiliary air supply at the bottom of the fan casing is opened correspondingly, thus more air will be admitted at both places, but the draft through the pulverizing chamber will not be increased to any extent and the rapidity of feed will not be affected. The feed of the material is also controlled by regulating the space between the preliminary abrader, and the walls of the hopper which adjustment is provided for according to my invention. The herein described apparatus is also peculiarly adapted to the reduction and delivery of lignite and charcoal. On account of its woody and non-elastic character, lignite is not readily reduced by ordinary crushing or grinding devices as it has a tendency to clog the same. I have found, however, that it is readily reduced by the abrading devices herein described and may then be pulverized in the manner hereinbefore set forth.

In Figs. 25 and 26 I have shown a modified form of driving apparatus for the vertical shaft which is particularly designed to equalize the pull of the belts upon the shaft so as to facilitate its spinning upon a free axis and coming into a state of equilibrium as heretofore described. In these figures F represents the vertical shaft, provided with a pulley P⁹ connected thereto by the friction clutch P⁸ shown in Figs. 1, 12 and 13, and having its face provided with two grooves. P¹⁰ represents the driving shaft provided with a pulley P¹¹ having three grooves in its face, and located at one side of the shaft F, and P¹³ indicates an idle shaft provided with a pulley P¹² suitably mounted on the side of shaft F opposite the driving pulley P¹¹ and provided with two grooves in its face. 1 represents the main driving belt, connecting the driving pulley P¹¹ with a suitable source of power. 2 represents a belt connecting the driving pulley P¹¹ and idler P¹², which are preferably of larger diameter than the pulley P⁹. 3 represents a belt connecting driving pulley P¹¹ with the shaft pulley P⁹ and 4 represents a similar belt connecting the idler P¹² with the pulley P⁹. Instead of employing pulleys with several grooves or belt engaging faces, it is obvious that I might employ separate pulleys, but the arrangement shown and described is very compact and desirable for that reason.

It will be seen that the power of the driving belt 1, will be applied to the shaft F on opposite sides of its center and in opposite directions, by means of belts 3 and 4, thus equalizing the lateral pull upon the shaft F and facilitating its spinning and coming into a state of equilibrium.

I do not limit myself to the exact details of construction herein shown and described, as the same may be varied without departing from the spirit of my invention.

What I claim and desire to secure by Letters Patent is:—

1. In an apparatus for preparing and feeding fine fuel, the combination with preliminary reducing mechanism, comprising stationary and rotating parts, of a vertically disposed pulverizing chamber having impervious walls, located below and in direct communication with said preliminary reducing mechanism, and rotating pulverizing devices within said chamber, an ejector fan casing located below said pulverizing chamber and having an inlet opening communicating directly with the lower end of said pulverizing chamber, a fan rotating on a vertical axis located in said fan casing, a vertical rotating shaft, extending through said fan casing, pulverizing chamber and preliminary reducing mechanism and carrying said fan and the rotary parts of said pulverizing mechanism and said preliminary reducing mechanism and a delivery tube connected with said fan, for delivering the pulverized fuel, mixed with air, to a furnace, whereby the feed of the material through the apparatus will be in a downward direction to the ejector fan casing and will be facilitated by gravity and by the draft of air to said fan, substantially as described.

2. In an apparatus for preparing and feeding fine fuel, the combination with a hopper open at its upper end, a vertically diposed pulverizing chamber below said hopper communicating directly therewith and having impervious walls, and stationary impact bars extending inwardly therefrom, and an ejector fan casing below said pulverizing chamber and having its eye communicating directly with the lower end thereof, of a vertical rotatable shaft extending through said hopper, pulverizing chamber and fan casing, a rotary breaker mounted on said shaft within said hopper, rotary impact bars mounted on said shaft within the pulverizing chamber and extending outwardly therefrom, an ejector fan mounted on said shaft within the fan casing, and a delivery tube connected to said fan casing for delivering the pulverized fuel mixed with air to a furnace whereby the material is fed through the apparatus downwardly, and its feed is facilitated by gravity and by the draft of air through the hopper and pulverizing chamber to said fan, substantially as described.

3. In an apparatus for preparing and feeding fine fuel, the combination with a hopper open at its upper end, a vertically disposed pulverizing chamber below said hopper communicating directly therewith and having impervious walls, and stationary impact bars extending inwardly therefrom, and an ejector fan casing below said pulverizing chamber and having its eye communicating directly with the lower end thereof, of a vertical rotatable shaft extending through said hopper, pulverizing chamber and fan casing, a rotary breaker mounted on said shaft within said hopper, rotary impact bars mounted on said shaft within the pulverizing chamber and extending outwardly therefrom, an ejector fan mounted on said shaft within the fan casing, and a delivery tube connected to said fan casing for delivering the pulverized fuel mixed with air to a furnace, whereby the material is fed through the apparatus downwardly, and its feed is facilitated by gravity and by the draft of air through the hopper and pulverizing chamber to said fan, the pulverizing chamber being provided adjacent to its upper end with auxiliary air inlet openings, and regulating devices for said openings, for varying the feed of the material through the pulverizing chamber, substantially as described.

4. In an apparatus for preparing and feeding fine fuel, the combination with preliminary reducing mechanism, open at its upper end, a pulverizing mechanism located below said reducing mechanism and communicating therewith, and a horizontally disposed ejector fan and casing located below the pulverizing chamber and communicating therewith, said fan casing being provided with a delivery tube for delivering the fuel mixed with air to a furnace, a vertical shaft extending through said reducing mechanism, pulverizing mechanism and fan, and carrying all the rotary parts of said devices, said pulverizing chamber being provided with means for admitting air adjacent to its upper end and regulating devices therefor, and said fan casing being provided with an auxiliary air inlet to serve as a check draft, and a regulating device for said auxiliary air inlet, substantially as described.

5. In an apparatus for preparing and feeding fine fuel, the combination with a hopper open at its upper end, a vertically disposed pulverizing chamber below said hopper communicating directly therewith and having impervious walls, and stationary impact bars extending inwardly therefrom, and an ejector fan casing below said pulverizing chamber and having its eye communicating directly with the lower end thereof, of a vertical rotatable shaft extending through said hopper, pulverizing chamber and fan casing, a rotary breaker mounted on said shaft within said hopper, rotary impact bars mounted on said shaft within the pulverizing chamber and extending outwardly therefrom, an ejector fan mounted on said shaft within the fan casing, and a delivery tube connected to said fan casing for delivering the pulverized fuel mixed with air to a furnace, whereby the material is fed through the apparatus downwardly, and its feed is facilitated by gravity and by the draft of air through the hopper and pulverizing chamber to said fan, and regulating devices for controlling the amount of air passing through the apparatus to the fan, substantially as described.

6. In an apparatus for preparing and feeding fine fuel, the combination with a hopper open at its upper end and provided with interior retaining wings, a pulverizing chamber below and communicating with said hopper and provided with stationary impact bars, and a horizontal fan casing below said pulverizing chamber and having its eye communicating therewith, of a vertical shaft extending through said hopper pulverizing chamber and fan casing, an abrading device, varying in horizontal diameter from top to bottom, mounted on said shaft within said hopper, a series of rotary impact bars mounted on said shaft within said fan casing, and means for adjusting the vertical positions of said abrading device and hopper, the one with respect to the other, to vary the feed therefrom to the pulverizing chamber, substantially as described.

7. In an apparatus for preparing and feeding fine fuel, the combination with the hopper provided with retaining wings, of a vertically disposed shaft extending therethrough, an abrading device varying in horizontal diameter from top to bottom, extending up into said hopper, a supporting block on said shaft having a threaded portion, a threaded collar on said block engaging said abrading device for adjusting it vertically, a vertical pulverizing chamber below said hopper provided with an aperture in its wall to enable said collar to be adjusted, a closing plate for said aperture, and an ejecting fan below said chamber, substantially as described.

8. In an apparatus for preparing and feeding fine fuel, the combination with a hopper, a pulverizing chamber below the hopper communicating therewith and provided with stationary impact bars and a fan casing below said chamber and communicating therewith, of a vertical shaft extending through said devices, an abrading device carried by said shaft within the hopper, a series of rotary impact arms carried by said shaft within said chamber, a fan carried by said shaft within the fan casing, mechanism for vertically adjusting said abrading device and hopper, the one with respect to the other, air inlet apertures adjacent to the top of the pulverizing chamber and regulating devices for said apertures, substantially as described.

9. In an apparatus for preparing and feeding fine fuel, the combination with a hopper, a pulverizing chamber below the hopper communicating therewith and provided with stationary impact bars and a fan casing below said chamber and communicating therewith, of a vertical shaft extending through said devices, an abrading device carried by said shaft within the hopper, a series of rotary impact arms carried by said shaft within said chamber, a fan carried by said shaft within the fan casing, mechanism for vertically adjusting said abrading device and hopper, the one with respect to the other, air inlet apertures adjacent to the top of the pulverizing chamber, regulating devices for said apertures, a supplemental air inlet aperture in the fan casing, and a regulating device for said aperture, substantially as described.

10. In an apparatus for preparing and feeding fine fuel, the combination with preliminary reducing mechanism, open at its upper end, a pulverizing mechanism, located below said reducing mechanism and communicating therewith, and a horizontally disposed ejector fan and casing located below the pulverizing chamber and communicating therewith, said fan casing being provided with a delivery tube for delivering the fuel mixed with air to a furnace, a vertical shaft extending through said reducing mechanism, pulverizing mechanism and fan, and carrying all the rotary parts of said devices, a supporting bearing for said shaft at its lower end, and means for maintaining said shaft in a vertical position when stationary or before attaining its normal speed and permitting a slight play of the upper end of the shaft, and means for rotating the shaft, whereby the rotation of the said shaft causes the rotary parts carried thereby to come into a state of equilibrium, substantially as described.

11. In an apparatus for preparing and feeding fine fuel, the combination with preliminary reducing mechanism, of a pulverizing chamber below the same and communicating therewith, having imperforate walls provided with inwardly extending impact bars, a fan casing below said chamber, communicating therewith, and concentric therewith, a vertical shaft extending through said fan casing and pulverizing chamber, a fan mounted on said shaft within said fan casing, rotary impact bars mounted on said shaft within said pulverizing chamber, a supporting bearing for the lower end of said shaft, a steadying bearing for said shaft, above said supporting bearing, providing lateral play for said shaft therein, and means for rotating said shaft, substantially as described.

12. In an apparatus for preparing and feeding fine fuel, the combination with an initial reducing mechanism, of a pulverizing chamber below the same, having an imperforate wall comprising a plurality of superposed ring sections, certain of said ring sections being provided with stationary impact bars, a central vertical shaft, a plurality of superposed blocks mounted thereon, certain of said blocks being provided with rotary impact bars alternating with the stationary impact bars, said ring sections being provided with studs on one face and recesses on the other face adapted to receive the studs of the adjacent section and bolts extending through and uniting said ring sections, substantially as described.

13. In an apparatus for preparing and feeding fine fuel, the combination with a pulverizing chamber comprising a plurality of superposed ring sections, stationary impact bars carried by certain of said sections, a supporting plate for said ring sections, a fan casing carried by said bottom plate, a hopper provided with a plate supported on said ring sections, bolts connecting said bottom plate, ring sections and hopper plate, a central vertical shaft extending through said fan casing, pulverizing chamber, and hopper, an abrader on said shaft within the hopper, rotary impact bars on said shaft within the pulverizing chamber and a fan on said shaft in said fan casing, substantially as described.

14. In an apparatus for preparing and feeding fine fuel, the combination with the hopper provided with retaining wings of a preliminary reducing device, a reducing device comprising an annular trough and rotating centrifugal balls, an adjustable stop for limiting the outward movement of said balls, a pulverizing chamber below said intermediate reducing device and an ejecting mechanism, substantially as described.

15. In apparatus for preparing and feeding fine fuel, the combination with an initial abrading mechanism, a pulverizing mechanism and an ejecting fan for delivering the fine fuel to a furnace, said parts being superposed one above another and each of said parts comprising stationary and rotating parts, of a vertical shaft, extending longitudinally through all of said parts and supporting and driving the rotary parts thereof, a supporting bearing for said shaft at its lower end, a guiding bearing for said shaft at its upper end, and a driving wheel on said vertical shaft, frictionally connected thereto whereby said driving wheel will be permitted to slip on the shaft in case the rotating parts encounter obstructions, substantially as described.

16. In an apparatus for preparing and feeding fine fuel, the combination with preliminary reducing mechanism, a pulverizing mechanism located below said reducing mechanism and communicating therewith, and a horizontally disposed ejector fan and casing located below said pulverizing chamber and communicating therewith, a vertical shaft extending through said reducing mechanism, pulverizing mechanism and fan and carrying all the rotary parts thereof, a step bearing for the lower end of said shaft, a steadying bearing for maintaining said shaft in vertical position when stopped and before attaining normal speed, said shaft being provided with a longitudinal oil passage communicating with said step bearing, and an oil receptacle mounted on the upper end of said shaft and communicating with said oil passage, substantially as described.

In testimony whereof I affix my signature, in the presence of two witnesses.

ALBERT A. DAY.

Witnesses:
JOHN W. DIXON,
WALTER M. HADDOCK.